United States Patent [19]

Stires, III et al.

[11] Patent Number: 4,926,192
[45] Date of Patent: May 15, 1990

[54] TAMPERPROOF STRIP CHART RECORDER WITH INACCESSIBLE COVER-MOUNTED TRANSDUCER

[75] Inventors: John C. Stires, III, 614 Camino De Clara, Solana Beach, Calif. 92075; Charles A. Bastyr, San Diego, Calif.

[73] Assignee: John C. Stires, III, Escondido, Calif.

[21] Appl. No.: 251,670

[22] Filed: Sep. 28, 1988

[51] Int. Cl.⁵ .............................................. G01D 9/00
[52] U.S. Cl. .............................. 346/33 TP; 346/145; 346/136
[58] Field of Search .................... 346/136, 145, 33 TP

[56] References Cited

U.S. PATENT DOCUMENTS

| | | | |
|---|---|---|---|
| 30,512 | 3/1878 | Stires, III | 346/19 |
| 32,108 | 4/1886 | Maxwell | 374/186 |
| 1,443,732 | 11/1920 | Cook . | |
| 2,557,437 | 2/1945 | Jepson | 346/112 |
| 3,140,144 | 11/1961 | Koch et al. | 346/17 |
| 3,221,321 | 5/1962 | Hashimoto | 340/261 |
| 3,299,403 | 11/1963 | Bush | 346/61 |
| 3,388,404 | 8/1966 | Bush | 346/24 |
| 3,787,885 | 1/1974 | Johnson | 346/136 |
| 4,044,362 | 8/1977 | Greenhut | 346/136 |
| 4,135,400 | 1/1979 | Maxwell et al. | 73/343.5 |
| 4,222,061 | 9/1980 | Stires, III | 346/145 |

Primary Examiner—George H. Miller, Jr.
Assistant Examiner—Huan Tran
Attorney, Agent, or Firm—Edward W. Callan

[57] ABSTRACT

A strip chart recorder has a chart dispenser, a platen, a writing table, and a chart advancing mechanism mounted in its base and a temperature-sensitive transducer having a bimetal coil mounted in its cover. The transducer is attached to a stylus that is mounted in the cover and marks the chart when the cover is closed as the chart that is being advanced across the platen. The cover includes a window and a lid for closing the window. The window is disposed over the writing table for enabling that portion of the chart that has been advanced over the writing table to be written upon after the cover has been closed. The cover is shaped for preventing access to the transducer and the marking means when the cover is closed with the window open. A detachable form is attached to the cover over the writing table and disposed in position for preventing closure of the lid prior to detachment of the form from the cover. The chart dispenser includes a chart chamber having a wall including an opening through which a tightly rolled chart may be inserted laterally. The chamber is dimensioned to enable the diameter of the rolled chart to expand to such extent that the inserted chart cannot be laterally removed from the chart chamber through the wall opening. Operation of the chart advancing mechanism is inhibited when it is sensed that there is no chart in the chart dispenser. The chassis is shaped to permit easy insertion and removal of a battery. A gear train of the chart advancing mechanism is mounted on a platform having a tab to facilitate assembly by insertion in a slot in the base. The cover defines a slot for receiving a tab on the bimetal coil of the transducer and a recess for axially receiving the coil and an attachment frame to facilitate assembly and permit precalibration of the bimetal coil.

14 Claims, 4 Drawing Sheets

TAMPERPROOF STRIP CHART RECORDER WITH INACCESSIBLE COVER-MOUNTED TRANSDUCER

BACKGROUND OF THE INVENTION

The present invention generally pertains to strip chart recorders and is particularly directed to improvements therein that enhance their usage and make them less costly to assemble.

Strip chart recorders are used to record variations in a sensed predetermined variable condition over a period of time. A typical strip chart recorder includes a case having a base and a cover, and containing a chart dispenser; a platen; means for advancing a chart from the chart dispenser across the platen; a transducer for sensing a predetermined variable condition; and marking means coupled to the transducer, with the marking means being disposed for marking that portion of the chart that is being advanced across the platen in a lateral position that is dependent upon the state of the sensed predetermined variable condition. Various prior art strip chart recorders are described in U.S. Pat. Nos. 4,222,061 and Re.30,512 to John C. Stires, III; Re.32,108 and 3,971,035 to Maxwell; 4,135,400 to Maxwell et al; 3,221,321 to Hashimoto; 1,443,732 to Cook; 2,557,437 to Jepson; 3,140,144 to Koch et al; 3,200,403 and 3,388,404 to Bush; 3,787,885 to Johnson; and 4,044,362 to Greenhut.

Some of the prior art strip chart recorders include certain additional desirable features, such as a writing table mounted in the base combined with a window in the cover and a lid for closing the window, with the window being disposed over the writing table for enabling that portion of the chart that has been advanced over the writing table to be written upon after the cover has been closed; means for sealing the cover in a closed position, whereby the recorder provides sealable access to that portion of the chart that is over the writing table when the cover is closed and the window is open; means on the inside of the cover for automatically latching the lid in a closed position upon the lid being closed combined with means on the inside of the cover for releasing the latching means, whereby, upon being latched, the lid can be opened again only after the cover is opened; the platen and the writing table being provided by a continuous surface of a single chassis; a chassis defining a chamber for receiving a battery having a given shape, combined with electrical contacts within the chamber for connection to the battery to enable the battery to power the advancing means; a peg being disposed on the lid for entering the case and peg engaging means for actuating the chart advancing means when the cover is closed; the chart dispenser including a chart chamber, having a wall including an opening through which a tightly rolled chart may be inserted laterally; the chart advancing means including a motor, such as a rotary stepping motor, means for periodically actuating the motor, a chart take-up spool for receiving the end of the chart that has been fed from the chart dispenser, and a gear train coupling the spool to the motor for rotating the spool to advance the chart upon each actuation of the motor; the transducer being mounted in the cover; the transducer including a bimetal coil; and the marking means including a stylus coupled to the bimetal coil for marking the chart.

Typically, the design of the prior art strip chart recorders is such that their assembly is highly labor intensive and thereby quite expensive.

It is an the object of the present invention to provide a strip chart recorder that affords certain desirable features of prior art strip chart recorders, but yet is of such design that its assembly is less expensive.

SUMMARY OF THE INVENTION

The present invention provides a tamperproof strip chart recorder including a case having a base and a cover; a chart dispenser, a platen and a writing table mounted in the base; means mounted in the base for advancing a chart from the chart dispenser across the platen and the writing table; a transducer mounted in the cover for sensing a predetermined variable condition; and marking means coupled to the transducer, with the marking means being mounted in the cover and so disposed that when the cover is closed, the marking means mark that portion of the chart that is being advanced across the platen in a lateral position that is dependent upon the state of the sensed predetermined variable condition; wherein the cover includes a window and a lid for closing the window, with the window being disposed over the writing table for enabling that portion of the chart that has been advanced over the writing table to be written upon after the cover has been closed; and wherein the cover is shaped for preventing access to the transducer and the marking means when the cover is closed with the window open, and thereby renders the strip chart recorder tamperproof.

The present invention further provides strip chart recorders having design features that make their assembly less labor intensive, and thereby less expensive.

In one such aspect of the present invention, in a strip chart recorder that includes a case having a base and a cover; a chart dispenser and a platen mounted in the base; means mounted in the base for advancing a chart from the chart dispenser across the platen; a transducer for sensing a predetermined variable condition; and marking means coupled to the transducer, with the marking means being disposed for marking that portion of the chart that is being advanced across the platen in a lateral position that is dependent upon the state of the sensed predetermined variable condition, the chart advancing means includes a motor; means for periodically actuating the motor; a chart take-up spool for receiving the end of the chart that has been fed from the chart dispenser; a gear train coupling the spool to the motor for rotating the spool to advance the chart upon each actuation of the motor, and a platform supporting the gear train, with the platform including a positioning tab; and the base includes a frame containing a slot for receiving the positioning tab to dispose the platform such that the gear train couples the motor to the spool.

In another such aspect of the present invention, in a strip chart recorder that includes a case; a chart dispenser; a platen; means mounted in the case for advancing a chart from the chart dispenser across the platen; a transducer mounted in the case for sensing a predetermined variable condition; and marking means coupled to the transducer, with the marking means being disposed for marking that portion of the chart that is being advanced across the platen in a lateral position that is dependent upon the state of the sensed predetermined variable condition, the transducer includes a bimetal coil having a positioning tab at one end of the coil; the case defines a slot for receiving the tab and a recess for axially receiving the coil; and the recorder further includes a frame for attaching the bimetal coil to the case with the coil received by the hub and the tab positioned in the slot. This combination not only facilitates assembly, but also permits the bimetal coil to be precalibrated prior to assembly.

In still another such aspect of the present invention, in a strip chart recorder that includes a case having a base and a cover, and containing a chart dispenser; a platen; means for advancing a chart from the chart dispenser across the platen; a transducer for sensing a predetermined variable condition; marking means coupled to the transducer, with the marking means being disposed for marking that portion of the chart that is being advanced across the platen in a lateral position that is dependent upon the state of the sensed predetermined variable condition; a chassis defining a chamber for receiving a battery having a given shape; and electrical contacts within the chamber for connection to the battery to enable the battery to power the advancing means; the chassis further defines an opening in a side wall of the chassis for receiving insertion of the battery; and the recorder further includes a platform for supporting the battery in a position in which the battery engages the electrical contacts; and a rib on the cover for preventing the battery from becoming disengaged from the electrical contacts when the cover is closed. As a result, a battery may be easily inserted and removed.

In another aspect of the present invention, in order to conserve energy by deactivating the chart advancing means once the chart has been fed from the chart dispenser, a chart sensor is provided for sensing the presence of the chart in the chart dispenser; and the chart advancing means is inhibited when the chart sensor senses that there is no chart in the chart dispenser.

Additional features of the present invention are described in relation to the description of the preferred embodiment.

DESCRIPTION OF THE PREFERRED EMBODIMENT

A preferred embodiment of the strip chart recorder of the present invention is adapted for recording a chart of temperature variations over a period of time. Such a temperature recorder is particularly useful for accompanying shipments of produce or other perishable goods to provide a record of temperature during the shipment of such goods.

Figure 1:
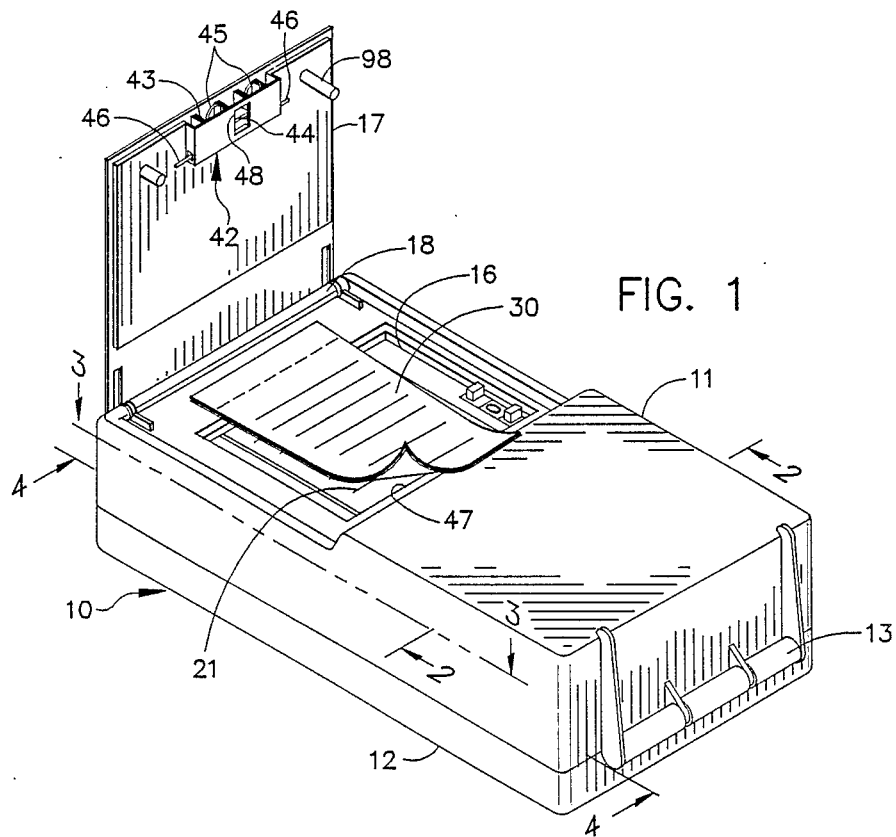
FIG. 1 is a perspective view of a preferred embodiment of the strip chart recorder of the present invention, with the cover closed and the window in the cover open to illustrate a detachable form, a lid locking mechanism and a portion of an actuator for the chart advancing means.

Referring to FIG. 1, a preferred embodiment of the strip chart recorder of the present invention includes a case 10 having a cover 11 and a base 12. The cover 11' is attached to the base 12 by a hinge 13. Within the base 12, there is mounted a chassis 14; and within the cover there is mounted a transducer 15, as shown in FIG. 5. The cover 11 includes a window 16 and a lid 17 for closing the window 16, as shown in FIGS. 1 and 5. The lid 17 is connected to the cover 11 by a hinge 18. The transducer 15 includes a bimetal coil 19, which is attached to a stylus 20, as shown in FIGS. 3, 4 and 5 for recording temperature variations on a chart 21.

Figure 3:
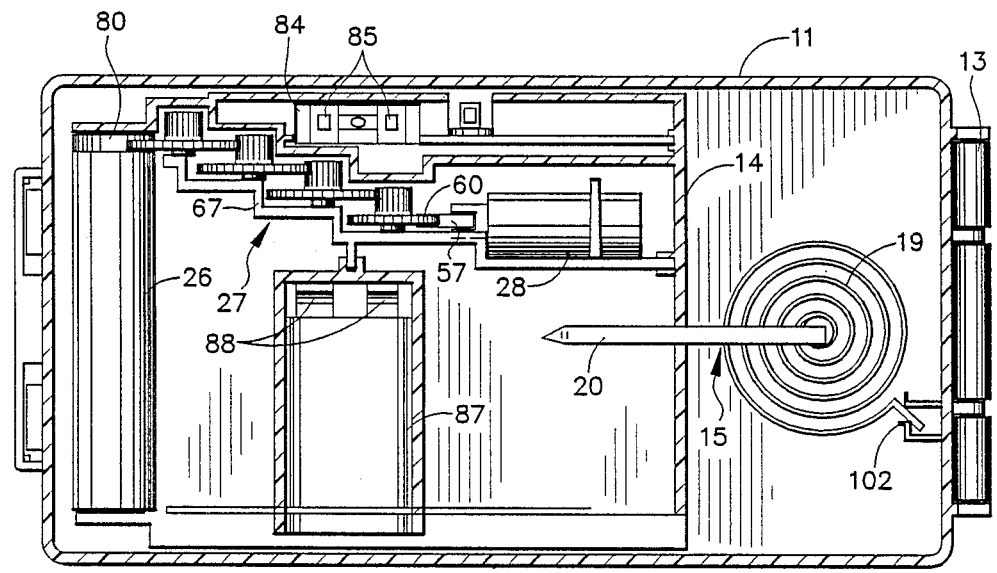
FIG. 3 is a top view of the strip chart recorder taken along line 3—3 of FIG. 1, with the cover removed and portions of the base cut away to illustrate the placement of the transducer, the marking means, the chart advancing means and the portion of the actuator for the chart advancing means.
Figure 4:
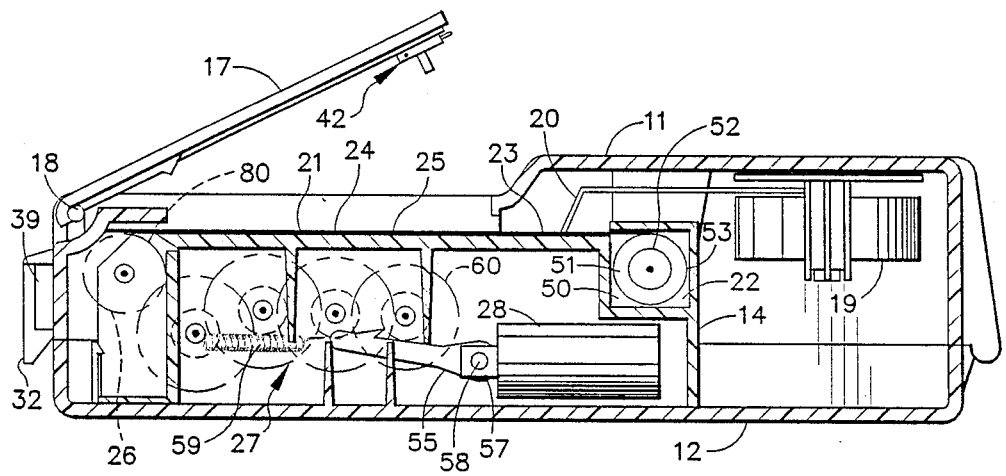
FIG. 4 is a side view of the strip chart recorder taken along line 4—4 of FIG. 1, with portions of the base and cover cut away to illustrate the chart dispenser, the platen, the writing table, the transducer, the marking means, the chart advancing means and the lid locking mechanism.
Figure 5:
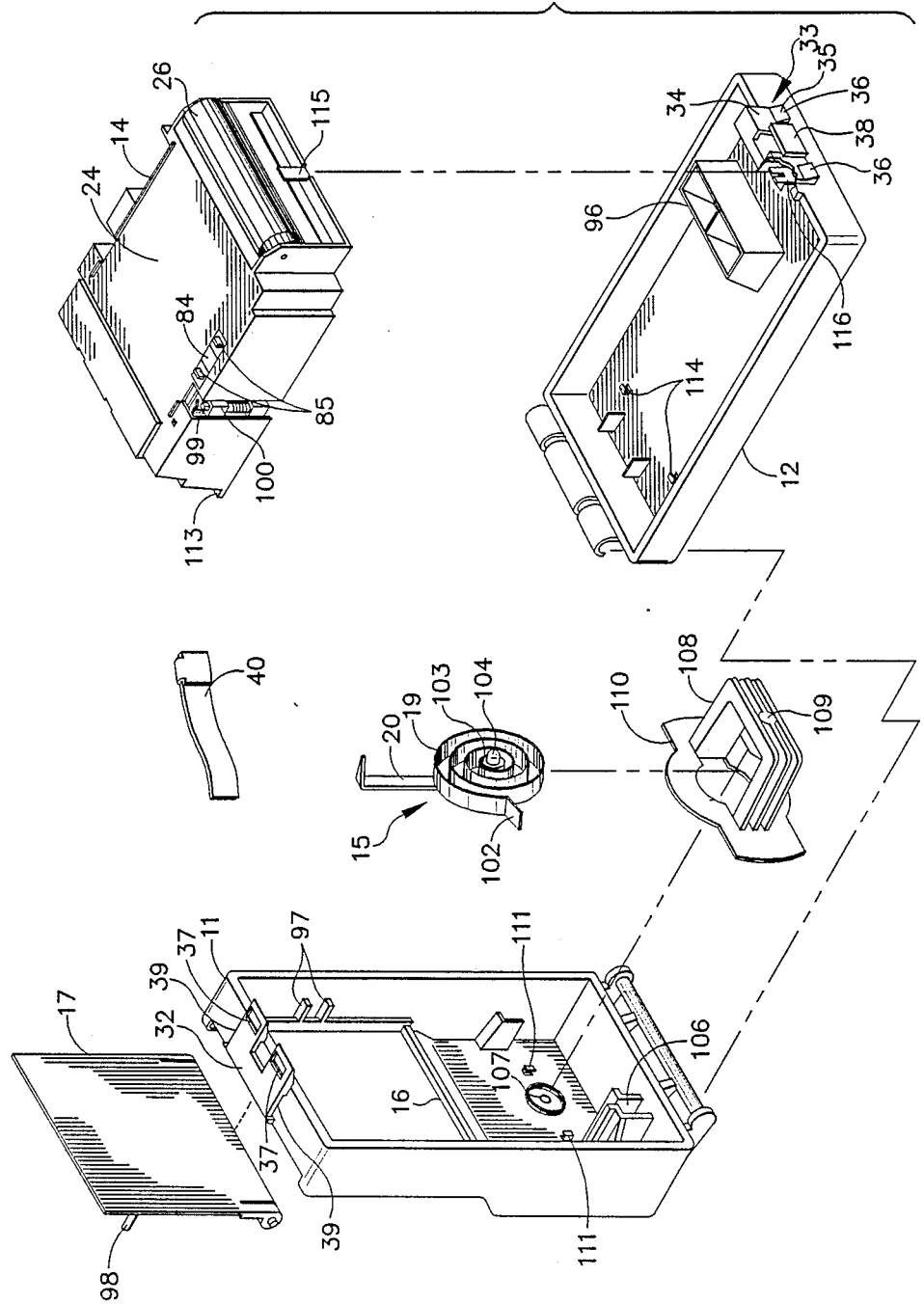
FIG. 5 is an exploded view of the interior of the strip chart recorder of FIG. 1, illustrating how the chassis and the transducer components are installed in the cover and the base and further illustrating the cover sealing means.
Figure 6:
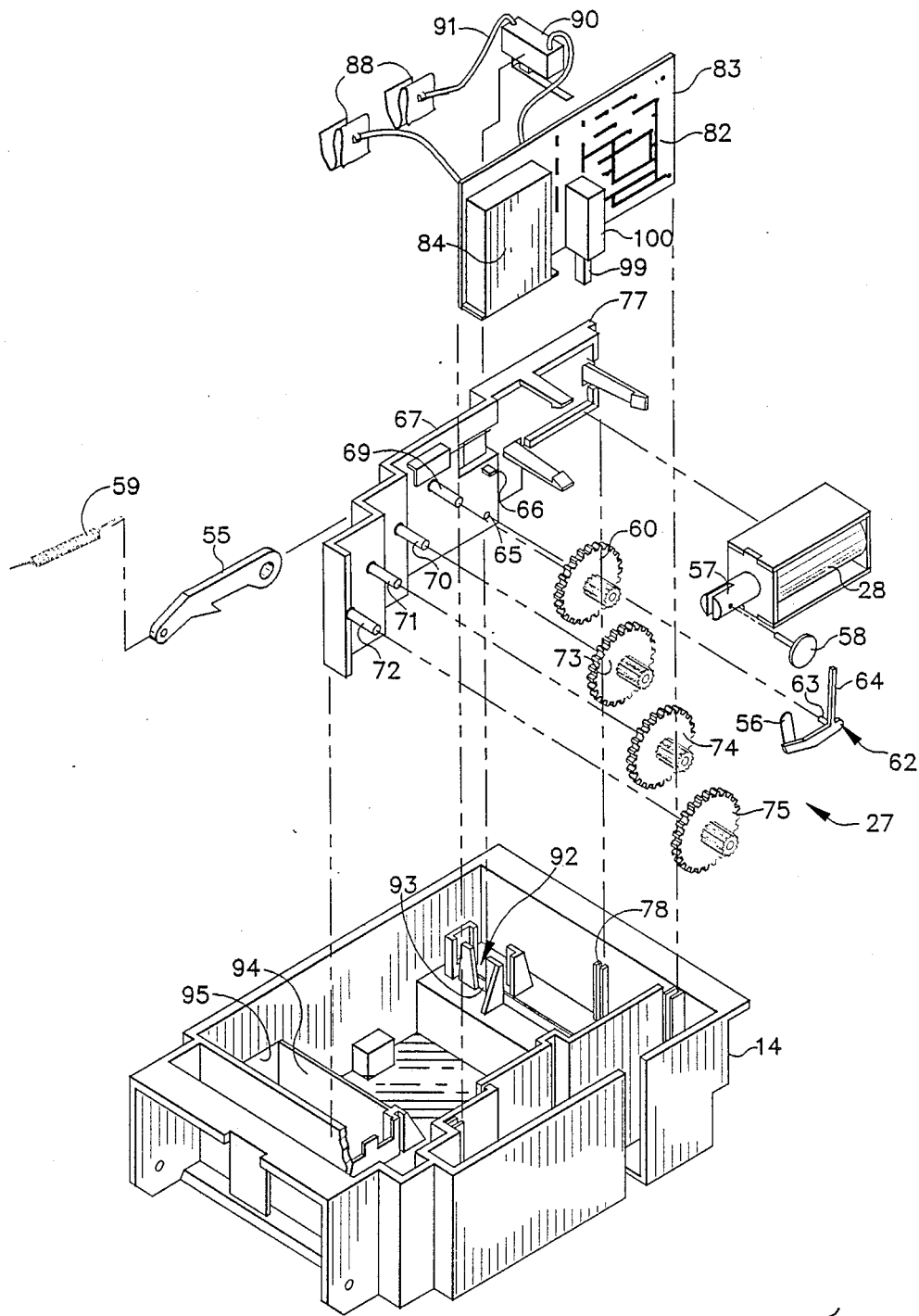
FIG. 6 is an exploded view of the chassis of the strip chart recorder of FIG. 1, as viewed from the button, illustrating how a circuit board and the components of the chart advancing means are installed in the chassis.

Referring to FIG. 4, the chassis 14 includes a chart dispenser 22, a platen 23, a writing table 24, and a chart advancing mechanism. The platen 23 and the writing table 24 are provided by a continuous surface 25 of the chassis 14. Referring to FIGS. 3, 4 and 6, the chart advancing mechanism includes a take-up spool 26, a gear train 27 and a solenoid motor 28. The end of the chart 21 that is fed from the chart dispenser 22 is attached to the take-up spool 26 and the chart 21 is advanced from the chart dispenser 22 across the platen 23 and the writing table 24 as the take-up spool 26 is rotated.

Referring to FIGS. 3 and 4, the bimetal coil 19 senses temperature variations by either expanding or contracting in accordance with any such temperature variations. The stylus 20 is attached to the bimetal coil 19 and is so disposed that when the cover 11 is closed, the stylus 20 marks that portion of the chart 21 that is being advanced across the platen 23 in a lateral position that is dependent upon the temperature sensed by the bimetal coil 19.

Referring to FIGS. 1, 4 and 5, the window 16 in the cover 11 is disposed over the writing table 24 for enabling that portion of the chart 21 that has been advanced over the writing table 24 to be written upon after the cover 11 has been closed.

A detachable form 30 is attached to the cover 11 over the writing table 24 and is disposed in a position for preventing closure of the lid 17 prior to detachment of the form 30 from the cover 11.

Referring to FIG. 5, the cover 11 includes a latch bracket 32, and the base 12 includes a latch hook 33. When the cover 11 is enclosed the latch bracket 32 is engaged by the latch hook 33 to latch the cover 11 in a closed position. The latch hook 33 includes a U-shaped member 34 which extends up from the base 12 and includes a downward extension 35. There are two protrusions 36 at the bottom of the downward extension 35. The latch bracket 32 includes two openings 37 for receiving the two protrusions 36. The downward extension 35 includes a center piece 38 that may be depressed to move the downward extension 35 to release the protrusions 36 from the openings 37, and thereby unlatch the base 12 from the cover 10. There are slots 39 in each side of the latch bracket 32 for receiving a sealing strip 40. With the cover 11 closed and latched by the latch bracket 32 and latch hook 33, the sealing strip 40 is inserted through the slots 39 and passes beneath the U-shaped member 34 to thereby prevent the cover 11 from being opened while the sealing strip 40 is so positioned. After the sealing strip 40 is passed through the slots 39, its ends are sealed together to thereby secure the cover 11 in a closed position. Referring to FIGS. 1 and 5, after the cover 11 has been sealed in its closed position by insertion and sealing of the sealing strip 40, the strip chart recorder is provided to the shippers of perishable goods, with the detachable form 30 attached to the cover 11 in order to prevent the lid 17 from being moved to close the window 16. The shipper can then record data pertaining to the trip on the detachable form 30 and on that portion of the chart 21 that is accessible through the window 16 and overlies the table 24. The detachable form 30 includes a pressure sensitive recording media so that the data recorded thereon also is recorded on the chart 21.

In order to prevent the shipper from tampering with the transducer 15, the cover 11 is shaped, as shown in FIGS. 1, 4 and 5, for preventing access to the transducer 15 when the cover 11 is closed with the window 16 open.

The lid 17 includes a locking mechanism 42, as shown in FIG. 1. The locking mechanism 42 includes a chamber 43 containing a wire 44 that is shaped to have two loops 45 that extend over the edge of the lid 17. The ends 46 of the wire 44 are unrestrained and extend out the sides of the chamber 43, so that when the lid 17 is closed the loops 45 retract momentarily and then hook under the opposing edge 47 of the cover 11 to automatically lock the lid 17 in a closed position. The lid 17 cannot be unlocked until the cover 11 is opened to provide access to the chamber 43. When the cover 11 is opened, the loops 43 may be retracted to open the lid 17 by pushing down against the wire 44 through an opening 48 in the chamber 43.

Referring to FIG. 4, the chart dispenser 22 includes a chart chamber 50 having a wall 51 that includes an opening 52 through which a tightly rolled chart may be inserted laterally. The chamber 50 is dimensioned to enable the diameter 53 of the rolled chart to expand to such extent that the inserted chart 21 cannot be laterally removed from the chart chamber 50 through the wall opening 52. This feature assures that the chart 21 does not become laterally dislodged from the chart chamber 50.

Referring to the chart advancing mechanism, as shown in FIGS. 3, 4 and 6, the solenoid 28 is coupled to the gear train 27 by first and second pawls 55 and 56. The first pawl 55 is connected to the armature 57 by a pin 58, and is connected to the frame of the chassis 14 by a spring 59. The first pawl 55 engages and rotates a ratchet gear 60 of the gear train 27 each time the solenoid armature 57 is protracted by actuation of the solenoid 28. The second pawl 56 engages the ratchet gear 60 to prevent it from returning to its prior position when the armature is retracted. The second pawl 56 is included in a component 62 that includes a hub 63 and a spring element 64. The hub 63 and the spring element 64 respectively engage a hole 65 and a post 66 in and on a platform 67. The platform 67 also includes hubs 69, 70, 71 and 72 for respectively mounting the rachet gear 60 and the remaining gears 73, 74 and 75 of the gear train 27. In addition, the solenoid 28 is mounted on the platform 67. The platform 67 includes a positioning tab 77.

The framework of the chassis 14 contains a slot 78 for receiving the positioning tab 77 to dispose the platform 67 such that the last gear 75 of the gear train 27 engages a gear 80 on the take-up spool 26 and thereby couples the solenoid 28 to the solenoid 28 to the take-up spool 26. This feature readily facilitates assembly of the gear train 27 for coupling the solenoid 28 to the chart take-up spool 26, in that the gears 60, 73, 74, 75, pawls 55, 56 and solenoid 28 can all be mounted on the platform 67 and aligned with each other prior to their insertion into the chassis 14.

The solenoid 28 is periodically actuated by a drive circuit 82 on a circuit board 83 in accordance with an actuation rate defined by a clock circuit 84 mounted on the circuit board 83. The clock rate is set operating push buttons 85 (shown in FIG. 3). The clock rate is set in accordance with the anticipated duration over which the temperature record is to be recorded so that the record will occupy most of the length of the chart 21. The drive circuit 82 is energized by a electrical battery 87, to which the drive circuit 82 is connected by electrical contacts 88.

A microswitch 90 is connected in series with one of the electrical leads 91 from one of the electrical contacts 88 to the drive circuit 82. The microswitch 90 is disposed in the framework of the chassis 14 in a position 92 for sensing when the chart dispenser 22 does not contain a chart 21. There is a slot 93 in the chassis framework through which a switch arm of the microswitch makes contact with and is restrained by the chart 21 when there is a chart 21 in the chart dispenser 22. When the chart dispenser 22 does not contain a chart 21, the switch arm is no longer restrained, and thus opens the microswitch 90 to open the connection between the battery 87 and the drive circuit 82 and thereby inhibit the drive circuit 82 from continuing to operate the solenoid 28 and the remainder of the chart advancing mechanism.

Figure 2:
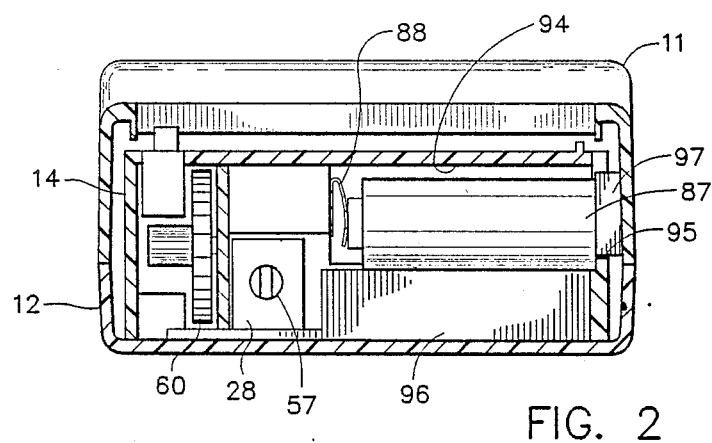
FIG. 2 is an end view of the strip chart recorder taken along line 2—2 of FIG. 1, with portions of the base and cover cut away to illustrate the placement of a battery in the recorder.

Referring to FIGS. 2, 5 and 6, the chassis includes a chamber 94 for receiving a standard nine-volt battery 87 having a given shape. There is an opening 95 in a side wall of the chassis 14 for receiving insertion of the battery 87. The electrical contacts 88 are positioned within the battery chamber 94 for contact with an inserted battery 87. The base 12 includes a platform 96 for supporting the battery 87 in a position in which the battery engages the electrical contacts 88, and ribs 97 on the cover 11 for preventing the battery 87 from becoming disengaged from the electrical contacts 88 when the cover 11 is closed.

Referring to FIGS. 1, 5 and 6, the chart advancing mechanism is actuated when the lid 17 and the cover 11 are both closed. The lid 17 includes a peg 98, which is disposed such that it 98 enters the case 10 when the lid 17 is closed, and engages a push button 99 of an actuation switch 100 mounted on the circuit board 83. The actuation switch 100 is included in the drive circuit 82. When the push button 99 is engaged and depressed by the peg 98, the drive circuit 82 is enabled for driving the solenoid 28.

Referring to FIGS. 3 and 5, the bimetal coil 19 has a positioning tab 102 at one end of the coil 19. The coil 19 is axially mounted on an axel 103, which terminates in hubs 104. The inside of the cover 11 defines a slot 106 for receiving the tab 102 and further defines a recess 107 for axially receiving one hub 104 of the coil axel 103. An attachment frame 108 includes a centrally located recess 109 for axially receiving the other hub (not shown) of the coil axel 103. The attachment frame 108 includes a flange 110 that is rotated to fit beneath two hooks 111 on the inside of the cover 11 to thereby secure the bimetal coil 19 to the inside of the cover 11.

Referring to FIG. 5, one end of the chassis 14 includes a flange 113, which is inserted beneath two hooks 114 on the inside of the base 12 to install the chassis 14 in the base 12. When the chassis 14 is so installed, a tab 115 at the other end of the chassis 14 snaps beneath a flexible hook 116 to secure the chassis 14 in the base 12.

We claim:

1. A strip chart recorder, comprising
   a case having a base and a cover,
   a chart dispenser mounted in the base;
   a platen mounted in the base;
   a writing table mounted in the base;
   means mounted in the base for advancing a chart from the chart dispenser across the platen and the writing table;
   a transducer mounted in the cover for sensing a predetermined variable condition; and
   marking means coupled to the transducer, with the marking means being mounted in the cover and so disposed that when the cover is closed, the marking means mark that portion of the chart that is being advanced across the platen in a lateral position that is dependent upon the state of the sensed predetermined variable condition; and
   wherein the cover includes a window and a lid for closing the window, with the window being disposed over the writing table for enabling that portion of the chart that has been advanced over the writing table to be written upon after the cover has been closed; and
   wherein the cover is shaped for preventing access to the transducer and the marking means when the cover is closed with the window open.

2. A recorder according to claim 1, wherein the platen and the writing table are provided by a continuous surface of a single chassis.

3. A recorder according to claim 1, wherein the chart dispenser includes a chart chamber having a wall including an opening through which a tightly rolled chart may be inserted laterally, and with the chamber being dimensioned to enable the diameter of the rolled chart to expand to such extent that the inserted chart cannot be laterally removed from the chart chamber through said wall opening.

4. A recorder according to claim 1, comprising
   a chassis defining a chamber for receiving a battery having a given shape, and further defining an opening in a side wall of the chassis for receiving insertion of the battery;
   wherein the recorder further comprises electrical contacts within the chamber for connection to a said battery to enable the battery to power the advancing means;
   wherein the base includes a platform for supporting the battery in a position in which the battery engages the electrical contacts; and
   a rib on the cover for preventing the battery from becoming disengaged from the electrical contacts when the cover is closed.

5. A recorder according to claim 1, further comprising means for sealing the cover in a closed position, whereby the recorder provides sealable access to that portion of the chart that is over the writing table when the cover is closed and the window is open.

6. A recorder according to claim 1, further comprising
   means on the inside of the cover for automatically latching the lid in a closed position upon the lid being closed; and
   means on the inside of the cover for releasing the latching means;
   whereby, upon being latched, the lid can be opened again only after the cover is opened.

7. A strip chart recorder comprising
   a case having a base and a cover;
   a chart dispenser mounted in the base;
   a platen mounted in the base;
   a writing table mounted in the base;
   means mounted in the base for advancing a chart from the chart dispenser across the platen and the writing table;
   a transducer for sensing a predetermined variable condition; and
   marking means coupled to the transducer; with the marking means so disposed that when the cover is closed, the marking means mark that portion of the chart that is being advanced across the platen in a lateral position that is dependent upon the state of the sensed predetermined variable condition;
   wherein the cover includes a window and a lid for closing the window, with the window being disposed over the writing table for enabling that portion of the chart that has been advanced over the writing table to be written upon after the cover has been closed; and
   a detachable form attached to the cover over the writing table and disposed in position for preventing closure of the lid prior to detachment of the form from the cover.

8. A recorder according to claim 7, further comprising
   a peg attached to the lid and disposed for entering the case when the lid is closed;
   actuation means disposed in the base for being engaged by the peg when the lid is closed, wherein the actuation means actuate said chart advancing means when engaged by the peg.

9. A strip chart recorder comprising
   a case having a base and a cover;
   a chart dispenser mounted in the base;
   a platen mounted in the base;
   means mounted in the base for advancing a chart from the chart dispenser across the platen;
   a transducer for sensing a predetermined variable condition; and
   marking means coupled to the transducer, with the marking means being mounted in the cover and so disposed that when the cover is closed, the marking means mark that portion of the chart that is being advanced across the platen in a lateral position that is dependent upon the state of the sensed predetermined variable condition; and
   wherein the chart advancing means comprises
   a motor;
   means for periodically actuating the motor;
   a chart take-up spool for receiving the end of the chart that has been fed from the chart dispenser;

a gear train coupling the spool to the motor for rotating the spool to advance the chart upon each actuation of the motor;
a platform supporting the gear train, with the platform including a positioning tab; and
a frame in the base containing a slot for receiving the positioning tab to dispose the platform such that the gear train couples the motor to the spool.

10. A strip chart recorder comprising
a case having a base and a cover;
a chart dispenser mounted in the base;
a platen mounted in the base;
a writing table mounted in the base;
means mounted in the base for advancing a chart from the chart dispenser across the platen and the writing table;
a transducer mounted in the cover for sensing a predetermined variable condition; and
marking means coupled to the transducer, with the marking means being mounted in the cover and so disposed that when the cover is closed, the marking means mark that portion of the chart that is being advanced across the platen in a lateral position that is dependent upon the state of the sensed predetermined variable condition;
wherein the transducer comprises a bimetal coil having a positioning tab at one end of the coil;
wherein the inside of the cover defines a slot for receiving the tab and a recess for axially receiving the coil; and
wherein the recorder further comprises means for attaching the bimetal coil to the cover with the coil received by the recess and the tab positioned in the slot.

11. A strip chart recorder, comprising
a case having a base and a cover;
a chart dispenser mounted in the base;
a platen mounted in the base;
means mounted in the base for advancing a chart from the chart dispenser across the platen;
a transducer for sensing a predetermined variable condition; and
marking means coupled to the transducer, with the marking means being disposed for marking that portion of the chart that is being advanced across the platen in a lateral position that is dependent upon the state of the sensed predetermined variable condition;
wherein the chart advancing means includes
a motor;
means for periodically actuating the motor;
a chart take-up spool for receiving the end of the chart that has been fed from the chart dispenser;
a gear train coupling the spool to the motor for rotating the spool to advance the chart upon each actuation of the motor; and
a platform supporting the gear train, with the platform including a positioning tab; and
the base includes a frame containing a slot for receiving the positioning tab to dispose the platform such that the gear train couples the motor to the spool.

12. A strip chart recorder, comprising
a case;
a chart dispenser;
a platen;
means mounted in the case for advancing a chart from the chart dispenser across the platen;
a transducer mounted in the case for sensing a predetermined variable condition; and
marking means coupled to the transducer, with the marking means being disposed for marking that portion of the chart that is being advanced across the platen in a lateral position that is dependent upon the state of the sensed predetermined variable condition;
wherein the transducer includes
a bimetal coil having a positioning tab at one end of the coil;
wherein the inside of the case defines a slot for receiving the tab and a recess for axially receiving the coil; and
wherein the recorder further comprises means for attaching the bimetal coil to the case with the coil received by the recess and the tab positioned in the slot.

13. A strip chart recorder, comprising
a case having a base and a cover, and containing
a chart dispenser;
a platen;
means for advancing a chart from the chart dispenser across the platen;
a transducer for sensing a predetermined variable condition;
marking means coupled to the transducer, with the marking means being disposed for marking that portion of the chart that is being advanced across the platen in a lateral position that is dependent upon the state of the sensed predetermined variable condition;
a chassis defining a chamber for receiving a battery having a given shape, and further defining an opening in a side wall of the chassis for receiving insertion of the battery;
electrical contacts within the chamber for connection to a said battery to enable the battery to power the advancing means; and
a platform for supporting the battery in a position in which the battery engages the electrical contacts; and
a rib on the cover for preventing the battery from becoming disengaged from the electrical contacts when the cover is closed.

14. A strip chart recorder, comprising
a case having a base and a cover, and containing
a chart dispenser;
a platen;
means for advancing a chart from the chart dispenser across the platen;
a transducer for sensing a predetermined variable condition;
marking means coupled to the transducer, with the marking means being disposed for marking that portion of the chart that is being advanced across the platen in a lateral position that is dependent upon the state of the sensed predetermined variable condition;
means for sensing when the chart dispenser does not contain a chart; and
means for inhibiting the advancing means in response to the sensing means sensing that the chart dispenser does not contain a chart.

* * * * *